(12) United States Patent
Nichols et al.

(10) Patent No.: US 9,759,812 B2
(45) Date of Patent: Sep. 12, 2017

(54) SYSTEM AND METHODS FOR INTERSECTION POSITIONING

(71) Applicant: Trimble Inc., Sunnyvale, CA (US)

(72) Inventors: Mark Edward Nichols, Christchurch (NZ); Gregory Craig Wallace, Arvada, CO (US)

(73) Assignee: Trimble Inc., Sunnyvale, CA (US)

( * ) Notice: Subject to any disclaimer, the term of this patent is extended or adjusted under 35 U.S.C. 154(b) by 254 days.

(21) Appl. No.: 14/505,187

(22) Filed: Oct. 2, 2014

(65) Prior Publication Data

US 2016/0097849 A1   Apr. 7, 2016

(51) Int. Cl.
*G01S 13/91* (2006.01)
*G01S 13/92* (2006.01)
(Continued)

(52) U.S. Cl.
CPC .............. *G01S 13/91* (2013.01); *G01S 13/92* (2013.01); *G06K 9/00785* (2013.01); *G08G 1/0116* (2013.01); *G08G 1/0133* (2013.01); *G08G 1/0141* (2013.01); *G08G 1/0175* (2013.01); *G08G 1/04* (2013.01); *G08G 1/096716* (2013.01); *G08G 1/096741* (2013.01); *G08G 1/096783* (2013.01); *G08G 1/164* (2013.01); *G08G 1/166* (2013.01); *G01S 13/726* (2013.01)

(58) Field of Classification Search
CPC ........ G01S 13/91; G01S 13/92; G01S 13/726; G08G 1/0175; G08G 1/096716; G08G 1/0133; G08G 1/0141; G08G 1/04; G08G 1/164; G08G 1/0116; G08G 1/096783; G08G 1/166; G08G 1/096741; G06K 9/00785

See application file for complete search history.

(56) References Cited

U.S. PATENT DOCUMENTS 5,907,293 A * 5/1999 Tognazzini ........... B60W 40/04
340/436
5,926,114 A * 7/1999 Andrews ................ G08G 1/164
180/167

(Continued)

OTHER PUBLICATIONS

Econolite "RTMS G4" brochure. 2 pages. 2012. Accessed online Sep. 24, 2016 <http://www.traffic-tech.com/pdf/RTMS-G4.pdf>.*

*Primary Examiner* — Matthew M Barker
(74) *Attorney, Agent, or Firm* — Kilpatrick Townsend & Stockton LLP

(57) ABSTRACT

A system and methods are provided for providing intersection positioning data. In one embodiment, a method includes detecting one or more objects by a device, wherein the one or more objects are detected relative to at least a portion of a roadway by an integrated radar sensor of the device, and tracking one or more detected objects by the device to determine tracking data, wherein tracking includes determining a number of detected objects, determining speed of the one or more detected objects and determining position of the one or more detected objects. The method may also include outputting the tracking data by the device. The system and methods may advantageously be employed for transmitting one or more of a collision warning, red light warnings, red light violation warnings and operation characteristics of objects during a traffic incident relative to intersection.

17 Claims, 7 Drawing Sheets

(51) Int. Cl.
*G06K 9/00* (2006.01)
*G08G 1/01* (2006.01)
*G08G 1/017* (2006.01)
*G08G 1/04* (2006.01)
*G08G 1/0967* (2006.01)
*G08G 1/16* (2006.01)
*G01S 13/72* (2006.01)

(56) References Cited

U.S. PATENT DOCUMENTS

| | | | | |
|---|---|---|---|---|
| 6,970,102 B2* | 11/2005 | Ciolli | ............... | G08G 1/052 340/425.5 |
| 7,633,433 B2* | 12/2009 | Behrens | ............... | G01S 13/42 340/936 |
| 7,821,422 B2* | 10/2010 | Hutchison | ............... | G01S 13/92 340/907 |
| 7,978,122 B2* | 7/2011 | Schmidlin | ............... | G01S 7/03 340/937 |
| 8,842,022 B2* | 9/2014 | Wignot | ............... | G08G 1/08 340/917 |
| 9,129,519 B2* | 9/2015 | Aoude | ............... | G08G 1/00 |
| 9,412,271 B2* | 8/2016 | Sharma | ............... | G08G 1/052 |
| 9,429,648 B2* | 8/2016 | Sugiyama | ............... | G01S 13/02 |
| 9,436,877 B2* | 9/2016 | Edmondson | ............... | G06K 9/00771 |
| 2006/0066472 A1* | 3/2006 | Janssen | ............... | G08G 1/01 342/104 |
| 2006/0092043 A1* | 5/2006 | Lagassey | ............... | G07C 5/008 340/907 |
| 2011/0043378 A1* | 2/2011 | Bailey | ............... | G08G 1/07 340/917 |
| 2011/0098916 A1* | 4/2011 | Jang | ............... | G01C 21/3697 701/533 |
| 2011/0205086 A1* | 8/2011 | Lamprecht | ............... | G08G 1/08 340/928 |
| 2013/0041573 A1* | 2/2013 | Ochi | ............... | G01S 13/345 701/117 |
| 2014/0210646 A1* | 7/2014 | Subramanya | ............... | B61L 29/28 340/928 |
| 2015/0029039 A1* | 1/2015 | Mukaiyama | ............... | G08G 1/096716 340/905 |
| 2015/0319093 A1* | 11/2015 | Stolfus | ............... | H04L 47/122 370/237 |
| 2016/0027299 A1* | 1/2016 | Raamot | ............... | G08G 1/08 340/917 |
| 2016/0027300 A1* | 1/2016 | Raamot | ............... | G08G 1/08 340/922 |
| 2016/0267790 A1* | 9/2016 | Raamot | ............... | G08G 1/08 |

* cited by examiner

SYSTEM AND METHODS FOR INTERSECTION POSITIONING

FIELD

The present disclosure relates generally to detecting and tracking objects, and more particularly to a system and methods for intersection positioning based on radar scanning.

BACKGROUND

Intersections typically employ multiple traffic lights to manage traffic and vehicle flow. In addition to traffic lights, many intersections have red light enforcement cameras to detect traffic offenders. These systems, however, do not interact with vehicles. As such, conventional systems do not provide any information to vehicles other than the indication of a light color for a driver.

Recent developments signal innovation in vehicle systems such as vehicle-to-vehicle (V2V) and vehicle to infrastructure (V2I), collectively V2X systems. Conventional traffic control systems cannot support V2X systems. Vehicle to vehicle (V2V) and vehicle to infrastructure (V2I) require reliable and accurate positioning. However, reliable and accurate positioning is difficult to achieve. Conventional global positioning systems, in many cases, do not provide sufficient data for intersection positioning. In developed urban environments, accuracy and reliability is especially difficult due to obstruction of view and multipath error which limit the achievable accuracy of global positioning solutions. Reliable and accurate positioning may also be desired for intersection positioning.

Conventional imaging devices and imaging applications such as cameras are not suitable for detection and tracking of multiple objects in an intersection. Moreover, data collected by these devices is not suitable for distribution to a vehicle for V2X systems require reliable and accurate positioning.

The University of Melbourne has developed a Radar on a Chip (ROACH) system. In particular, the ROACH system is for advanced driving assistance to reduce risk and impact of accidents and collisions.

There exists a need in the art for systems and methods to provide reliable and accurate positioning to vehicles.

BRIEF SUMMARY OF THE EMBODIMENTS

Disclosed and claimed herein are a system and methods for providing intersection positioning data. In one embodiment, a method includes detecting one or more objects by a device, wherein the one or more objects are detected relative to at least a portion of a roadway by an integrated radar sensor of the device, and tracking one or more detected objects by the device to determine tracking data, wherein tracking includes determining a number of detected objects, determining speed of the one or more detected objects and determining position of the one or more detected objects. The method further includes outputting the tracking data by the device.

In another embodiment, a system is provided for providing intersection positioning data. The system includes an integrated radar sensor configured to detect one or more objects, wherein the one or more objects are detected relative to at least a portion of a roadway, and a processor configured to track one or more detected objects to determine tracking data, wherein tracking includes determining a number of detected objects, determining speed of the one or more detected objects and determining position of the one or more detected objects, and output the tracking data.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
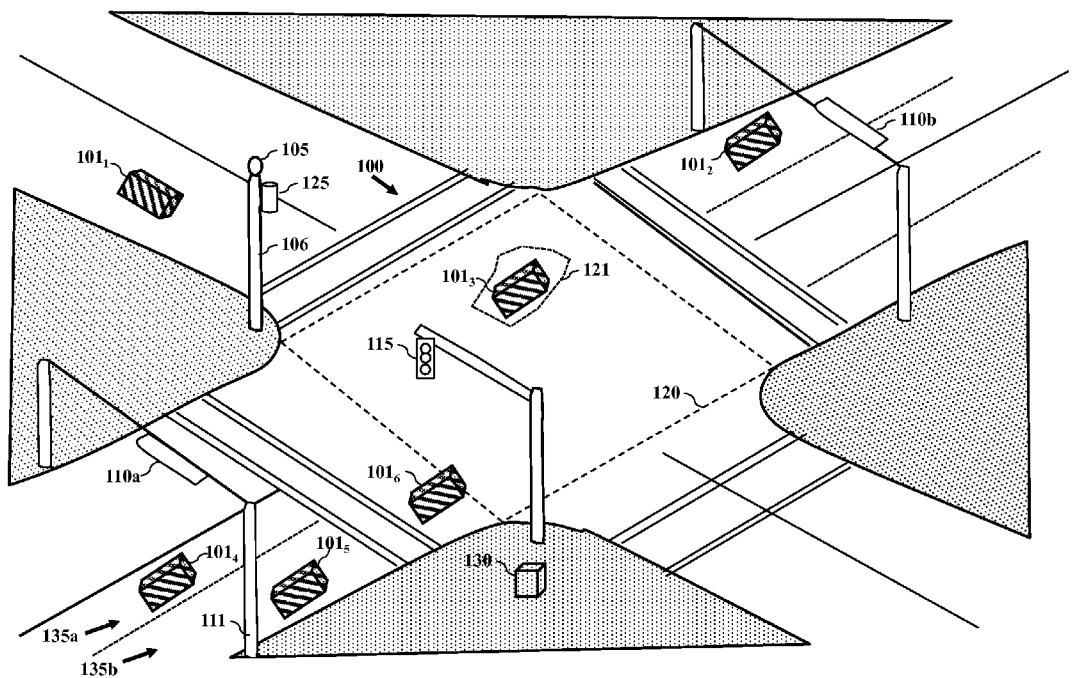
FIG. 1 depicts a graphical representation of an intersection according to one or more embodiments.

One aspect of the disclosure relates to intersection positioning and, in particular, detecting and tracking objects in and around a portion of a roadway using a radar sensor. In one embodiment, a radar scanning system including one or more radar scanning devices is provided to detect objects, such as vehicles, pedestrians, etc., moving and/or positioned relative to the intersection. In addition, a scanning system may be configured to track the position of detected objects to determine one or more of location, heading and speed of each object. The scanning system may detect and track objects based on output of a radar sensor and one or more of a known position of the scanning device, geospatial data (e.g., coordinates, etc.), distance, and an azimuth relative to the position of object. The scanning system may be configured to provide intersection positioning data. According to one or more embodiments, intersection positioning data may relate to object identification and tracking information, control signals for traffic control devices, and/or notice information, including warnings, for vehicles.

One advantage of the device and functionality described herein may be providing continuous real-time detection of one or more objects based on radar scanning with quality precision. In addition, radar scanning may allow for improved processing in comparison to conventional systems. Objects, as used herein, may be one or more physical elements, such as vehicles, pedestrians, and movable objects. The objects may be stationary, and/or in motion during tracking. In addition, detection of objects may include detection of one or more surfaces, such that coarse generalization may be provided for the object. In addition, a plurality of objects may be tracked by the scanning system.

According to one embodiment, a scanning system employs one or more high-resolution integrated radar sensors for detecting objects. The measurement resolutions (e.g., range and azimuth resolutions) of the high-resolution integrated radar sensor may be configured for determining position of objects, object dimensions, and to account for objects traveling at one or more speeds. In certain embodiments, the range resolution of the high-resolution integrated radar sensor may be 1 cm. According to another embodiment, the high-resolution integrated radar sensor may be configured to detect objects with in a range (e.g., distance from sensor) of 20-50 m. Using a 1 GHz bandwidth (e.g., the chirp sweep range), the range resolution of the high-resolution integrated radar sensor may be 0.05 m. Configuring the high-resolution integrated radar sensor within the 77-81 GHz band and using 2-3 GHz radar bandwidth, the high-resolution integrated radar sensor can provide a 0.02 m resolution with single chirp. In certain embodiments, the high-resolution integrated radar sensor may employ pulse integration to provide a 2 cm range resolution with an azimuth resolution of 0.2 deg. According to another embodiment, an integrated radar sensor may be configured for scanning in both horizontal and vertical directions.

According to another embodiment, objects may be detected by the scanning system by a radar sensor operating with a frequency in the range of 76-82 GHz. Exemplary configurations of the high-resolution integrated radar sensor can be configured to provide range resolution of 1.7 cm at a distance of 5 m and 10 cm range resolution at a distance of 30 m. The depth resolution may be fixed at 1 cm. This configuration is suitable for geospatial tracking.

With respect to radar scanning, the disclosure of U.S. patent application Ser. No. 14/096,305 titled System and Method for Data Point Detection and Spatial Modeling, and U.S. patent application Ser. No. 14/096,330 titled System and Methods for Canning with Integrated Radar Detection and Image Capture, are expressly incorporated by reference in their entirety.

According to another embodiment, systems and methods are provided for scanning one or more objects including detecting data points by an integrated radar sensor and capturing image data of one or more objects. In that fashion, the output of employed radar technology may be fused with one or more image sensors. For example, data generated by a radar sensor and one or more imaging sensors may be used to generate spatial models, and tracking one or more objects. According to another embodiment, captured image data may be matched to data points detected by the radar sensor. Geospatial data may then be matched with image data according to one or more embodiments. One or more embodiments may employ radar technology with characteristics that meet requirements for a low cost sensor, for fusion applications (e.g., image and radar data), and that offers complimentary capability of direct bearing, range and doppler measurements.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, one or more embodiments are described below with reference to operations that are performed by a computer system or a like electronic system. Such operations are sometimes referred to as being computer-executed. It should be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, a non-transitory medium, etc.

Exemplary Embodiments

Referring now to the figures, FIG. 1 depicts a graphical representation of an intersection according to one or more embodiments. Intersection 100 of FIG. 1 is illustrated as an exemplary representation of four-way intersection. In one embodiment, a scanning system may be configured to provide scanning of intersection 100 to determine one or more of the location, heading, speed of objects, such as vehicles $101_{1-n}$, around, and approaching intersection 100. In one embodiment, a scanning system may include one or more devices configured to detect objects. In an exemplary embodiment, a single scanning device may be configured to detect objects in and around the intersection. In other embodiment, a scanning system may employ multiple scanning devices, wherein each scanning device detects and tracks objects in a portion of intersection 100. In yet another embodiment, a scanning system may employ multiple scanning devices positioned relative to intersection 100 to detect and track objects. As will be discussed in more detail below with respect to FIG. 4, scanning devices may be configured to track position of objects by radar scanning relative to the fixed position of the scanning device. Scanning devices may be configured to calculate position of objects relative to global positioning data received by the scanning device, the global positioning data provided the fixed location of the scanning device.

In one embodiment, a scanning system may include a sensing device mounted on light or traffic control structures, such as scanning device 105 mounted to post 106 having traffic control light 125. Scanning devices 110a-110b relate to overhead scanning devices configured to detect objects traveling down a roadway prior to entering intersection 100. Scanning devices 110a-110b may be mounted to a structure or suspended from a cable or beam relative to a post, such as post 111. In certain embodiments, scanning devices may be integrated with a traffic control unit, such as traffic control unit 115 (e.g., traffic light).

Multiple scanning devices are shown in FIG. 1 and exemplary positions of scanning devices are shown. As will be discussed in more detail below with respect to FIG. 5, scanning devices may be positioned in one or more additional and/or different positions relative to an intersection or portion of a roadway, such as intersection 100. Scanning devices, such as scanning devices 105 and 110a-110b of FIG. 1, may be configured for scanning up to 360 degrees of an intersection. Each scanning device may include a processor or interoperate with a processor configured to control the scanning device to determine one or more of location, heading and speed of each object moving in and around an intersection. Scanning devices may be configured with dedicated short range communications (DSRC) and or network communications ability to transmit tracking data and/or warnings to objects detected within an intersection.

According to one or more embodiments, detection and/or tracking of objects may provide advantageous benefits for one or more applications. In one embodiment, a scanning system and methods are provided to identify moving objects in the field of view of a scanning device radar sensor for tracking data points and/or objects for motion elimination in computer vision algorithms, such as instances where an image frame overlaps with some or all of a radar sensor field of view. Another embodiment is directed to providing motion-based detection of one or more objects. Detection and characterization of objects when a device is in motion may allow for comparison of geospatial data based on multiple positions of a device to improve accuracy. In addition, motion based scanning may allow for improved intersection positioning and warning determinations.

According to one embodiment, one or more scanning devices may be configured to track position of objects relative to an intersection. Scanning devices may be configured generate object detection area 120 and associate the detection area as the intersection of one or more roads. The scanning system may be configured to generate a coarse representation of objects, such as object representation 121. Object representation 121 may be generated by a scanning device or processing unit 130 to represent the speed, heading, position and size of a detected object, such as object 101₃.

In certain embodiments, a scanning system may include processing unit 130 configured to process data from one or more scanning devices. In certain embodiments, processing unit 130 may be configured to transmit tracking data to one or more objects. In certain embodiments, a scanning system may generate warnings for objects to identify possible collisions within object detection area 120. In other embodiments, processing unit 130 may be configured to output control signals to traffic control units, such as traffic control unit 125 and/or traffic control unit 115.

In certain embodiments, scanning devices may be configured to detect the lane position of an object. By way of example, for objects 101₄ and 101₅, the scanning system may determine identify a lane associated with each object, such as lanes 135a and 135b, respectively.

Although FIG. 1 is described above as relating to an intersection of a roadway, and in particular a four-way intersection, it should be appreciated that the principles of the disclosure may be applied to other types of intersections and/or non-roadway applications. For example, radar detection and notification for a commercial area, loading dock, transportation center, airport or other areas which are not associated with a roadway.

Figure 2:
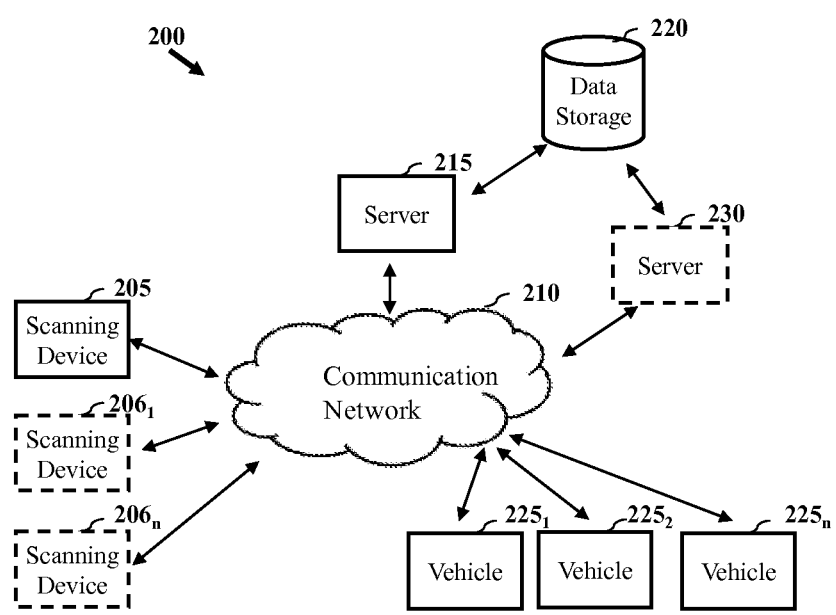
FIG. 2 depicts a simplified system diagram according to one or more embodiments.

FIG. 2 depicts a simplified system diagram according to one or more embodiments. According to one embodiment, system 200 may be configured to provide one or more of a collision warning system, red light warnings, red light violation warnings, and operation characteristics of objects during a traffic incident relative to intersection (e.g., intersection 100). As shown in FIG. 2, system 200 includes scanning device 205, communication network 210, server 215 and objects 225₁₋ₙ.

Scanning device 205 may be configured to output tracking data for detected objects relative to an intersections (e.g., intersection 100), to one more objects, such as vehicles. In one embodiment, the tracking data may be transmitted by way of a network communications, such as wireless network. In certain embodiments, scanning device 205 may be configured to output tracking data including information for objects 225₁₋ₙ to utilize the tracking information for self-identification, potential collisions/warning and the position of vehicles in close proximity. Scanning device 205 may relate to the scanning devices configured for radar detection of objects, such as scanning devices 105, 110 a-110 b, and 125 of FIG. 1.

Server 215 may be configured to transmit tracking data received from scanning device 205 via short range wireless communication. Server 215 may be configured to store tracking data in data storage unit 220.

System 200 may optionally include one or more additional scanning devices, such as scanning devices 206₁₋ₙ, to detect and track objects from one or more additional positions. Server 215 may be configured to receive tracking data from scanning devices 206₁₋ₙ by way of communication network 210. In certain embodiments, system 200 may include one or more additional servers, such as optional server 230, to aid in collection of tracking data from scanning devices and providing the tracking data to objects 225₁₋ₙ.

Figure 3:
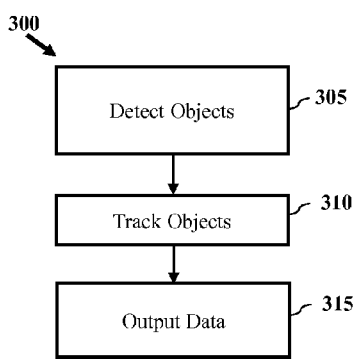
FIG. 3 depicts a process for providing intersection positioning data according to one or more embodiments.

FIG. 3 depicts a process for providing intersection positioning data according to one or more embodiments. Process 300 may be initiated at block 305 by detecting one or more objects by a device (e.g., scanning device 205). One or more objects may be detected at block 305 relative to at least a portion of a roadway by an integrated radar sensor of a scanning device. Object detection at block 305 may include detection of objects by at least one of a solid-state radar sensor and chip based radar sensor. According to one or more embodiments, objects relate to one or more of a vehicle, pedestrian and objects in general. Objects may be detected relative to a detection area or a portion of a roadway, such as one or more of an intersection, lane merge, highway entrance, and parking location, etc. In another embodiment, object detection may apply to safety applications including one or more of situational awareness, fleet safety (e.g., envelope clearance for tunnel, bridge underpass, loading bays, etc.), vehicle mounted detectors, infrastructure mounted sensors, and temporary envelope monitoring during roadwork.

According to another embodiment, detecting objects at block 305 may be based on a radar sensor which may include resolving a returned signal down (e.g., reflected signal) to an approximation of the object. In that fashion, the size of an object may be an average of radar measurements. In certain embodiments, the radar sensor may be characterized with an azimuth resolution which is larger than its azimuth accuracy. As such, as the distance increases from a radar sensor, the shape of the detected objects may change. In such a case, the range resolution will not change, however, the detected shape of the objects may be increased in one or more dimensions.

According to another embodiment, detecting objects at block 305 can include application of a coordinate transform radar sensor data to a cartesian coordinate system. The measurement data in the cartesian coordinate system may be employed for one or more of a 3D point cloud representation, analysis, manipulation, etc.

Object detection at block 305 may be based on horizontal and/or vertical scanning. In one embodiment, objects may be detected at block 305 by generating a sweep signal configured to detect a plurality of data points during a single sweep. Detection of data points may include one or more of a short-range mode and a long-range mode for measurement and detection of objects. In one or more embodiments, objects may be detected at block 305 with a grid spacing resolution (e.g., 1-2 cm) and for objects up to a range of 200 m. Objects may be determined relative to geospatial data points. In one embodiment, objects may be determined by an integrated radar sensor having a frequency within the range of 76-82 GHz.

At block 310, one or more detected objects may be tracked by the scanning device to determine tracking data. Tracking at block 310 can include determining a number of detected objects, determining speed of detected objects and position of the detected objects. In one embodiment, tracking includes continuous monitoring of object speed, heading, and position relative to objects detected in an intersection. The scanning device may track objects relative to an intersection wherein the tracking may be terminated after a vehicle exits the intersection or a detection zone. Tracking may also be based on the particulars of a detected object, such as estimations of vehicle dimensions. In that fashion an approximation of a vehicle may be employed for faster processing of object data. Tracking can include estimating vehicle dimensions and path. Tracking may include receiving data from a scanning device detecting objects at a location of the roadway different from the location of the intersection. For example, overhead scanning may be performed at a predetermined distance form the detection zone of the intersection.

The scanning device can output tracking data at block 315. In one embodiment, outputting includes transmitting tracking data to one or more vehicles associated with detected objects. In another embodiment, outputting data includes transmitting a collision warning signal to one or more detected objects based on the tracking.

As will be discussed in more detail below, and in particular with respect to FIGS. 8 and 9, intersection scanning may employ additional data/information sources for providing a collision warning. In addition, traffic control information for the portion of the roadway may be determined based on detected tracking data. The traffic control information may be output as an warning indication for objects and/or employed for controlling a traffic signal control.

Figure 4:
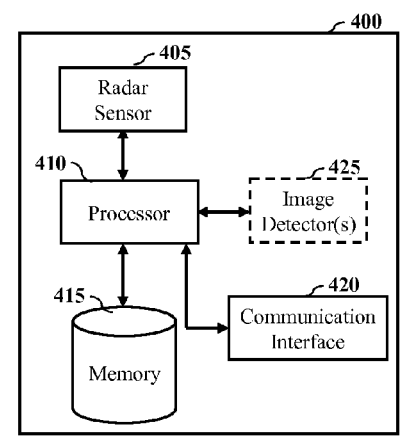
FIG. 4 depicts a simplified diagram of a scanning device according to one or more embodiments.

Referring now to FIG. 4, a simplified diagram of a scanning device is depicted according to one or more embodiments. Scanning device 400 includes radar sensor 405, processor 410, memory 415 and communication interface 420.

Elements of device 400 may be configured to communicate and interoperate with processor 410 by a communication bus. Processor 410 may be configured to control operation of device 400, or another device, based on one or more computer executable instructions stored in memory 415. Memory 415 may relate to one of RAM and ROM memories and may be configured to store one or more files, and computer executable instructions for operation of device 400. Although depicted as a single memory unit, memory 415 may relate to one or more of internal device memory and removable memory. Memory 415 may store data associated with data points, positioning data, spatial models, and non-transitory computer readable code for operating device 400.

Radar sensor 405 may be configured to detect objects, such as vehicles, pedestrians, etc. In certain embodiments, process 410 may be configured to remove or ignore data associated with non-movable objects located in a roadway (e.g., traffic barrier, structures, etc.). Each object may be determined relative to a determined position of radar sensor 405. In one embodiment, multiple data points may be detected at one time by radar sensor 405. Processor 410 may control storage of each object in memory 415 and in some cases storage may be based on or associated with a reference point.

According to one embodiment, radar sensor 405 may be a high-resolution sensor for detecting and scanning objects. Radar sensor 405 may be an integrated radar sensor configured to use long range and/or short range beams. In certain embodiments, radar sensor 405 may be an integrated radar sensor, such as a chip-based radar sensor configured to detect objects for distances up to 200 m. By employing an integrated radar sensor, the sensor may be employed for applications previously impractical due to size, power and/or cost of sensors.

In certain embodiments, radar sensor 405 may generate measurement data associated with a polar coordinate system. Radar sensor 405 may be configured to detect objects based on operation within a frequency range of 76-82 GHz, or similarly in the frequency range of 77-81 GHz. As an integrated radar sensor, radar sensor 405 may operate with low power, with a small package and at low cost. The beam of radar sensor 405 may have a broader beam cross section, in comparison to a laser beam, and thus strikes a much larger surface area. As such, a radar based system as described herein can reduce the number of objects in comparison to the number of objects required for a laser system. Radar sensor 405 may be a solid-state radar sensor or chip-based radar sensor, configured for beam steering and/or vertical and horizontal scanning to generate cross section representations or coarse representations of objects. Multiple objects may be determined by radar sensor 405 in a single sweep.

According to one embodiment, radar sensor 405 may have a short-range mode with a range of 50 m, and a long-range mode with a range of up to 200 m. In certain embodiments, radar sensor 405 may include a range accuracy for the short-range mode (e.g., 0.02 m) and a range accuracy for the long-range mode (e.g., 0.15 m). Radar sensor 405 may be configured to detect objects with in a range (e.g., distance from sensor) of 20-50 m. Using a 1 GHz bandwidth (e.g., the chirp sweep range), the range resolution of radar sensor 405 may be 0.05 m. Radar sensor 405 may be configured within the 77-81 GHz band and using 2-3 GHz radar bandwidth and can provide better than 0.02 m resolution with single chirp. In certain embodiments, radar sensor 405 may employ pulse integration to provide a 2 cm range resolution with an azimuth resolution of 0.2 deg. In certain embodiments, radar sensor 405 may include one or more of a planar patch antenna, dielectric lens antenna and reflector antenna. Processor 410 may be configured to convert objects detected by radar sensor 405 in two or three dimensions.

Azimuth resolution and field of view are decoupled from the range resolution, and may be set by the array geometry and the phased chirp of the high-resolution integrated radar sensor. The high-resolution integrated radar sensor may employ a custom array (different size and higher number of elements X and Y) to increase the resolution for a single shot in certain embodiments. According to another embodiment, the high-resolution integrated radar sensor can use a number of several overlapping phased pulses to artificially increase resolution (e.g., each pulse 2 mS) to allow for static scenes (over 10-20 mS, i.e. short time). In some cases, the performance of the high-resolution integrated radar sensor may achieve at best a 0.1 deg azimuth resolution.

According to one or more embodiments, radar sensor 405 may produce bearing, range and Doppler data for objects in the field of view of the sensor, without reliance on ambient light, or susceptibility to difficult lighting conditions. Benefits of radar sensor 405 may be a sensor that is without moving parts, and a low susceptibility to environmental factors such as dust on sensor lens, vibration, and weather conditions. These benefits may be a key advantage of radar sensor 405 compared to other technologies. Radar sensor 405 may have a wide number of applications which conventional alternatives, such as laser scanners (e.g., LIDAR) or image detection, are not suitable.

Communication interface 420 may include one or more elements to allow for communication by device 400 by wired or wireless communication. Communication interface 420 may include one or more ports for receiving data, including ports for removable memory. Communication interface 420 may be configured to allow for wired and wireless network based communications including but not limited to LAN, WAN, Wi-Fi, etc. In certain embodiments, communication interface 420 may allow for short-range wireless communication with one or more devices.

Communication interface 420 may include one or more modules configured to receive positioning data from one or more sources, such as global positioning data (e.g., Global navigation Satellite System (GNSS), International GNSS Service (IGS), etc.). Based on positioning data received by device 400, processor 410 can determine a known coordinated point with a know orientation at the intersection. Device 400 position may be employed for determining position and orientation of objects detected.

In some embodiments, device 400 may be incorporated into another device, such as a traffic controller.

Device 400 may optionally include optional image detector 425 to collect image data. Image data collected by device 400 may be stored in association with one or more of radar sensor data and positioning data determined by the device. Optional image detector 425 may include one or more imaging sensors for detecting image and/or video data. Image sensors of optional image detector 425 may relate to one or more cameras or imaging devices configured to detect image or video data. The image detectors may allow for a plurality of focal lengths to provide a plurality of zoom levels. Imaging data collected by device 400 may be aligned with a particular detection zone or portion of an intersection. Optional image detector 425 may be configured to detect image data with a range and detection window similar to radar sensor 405.

Figure 5:
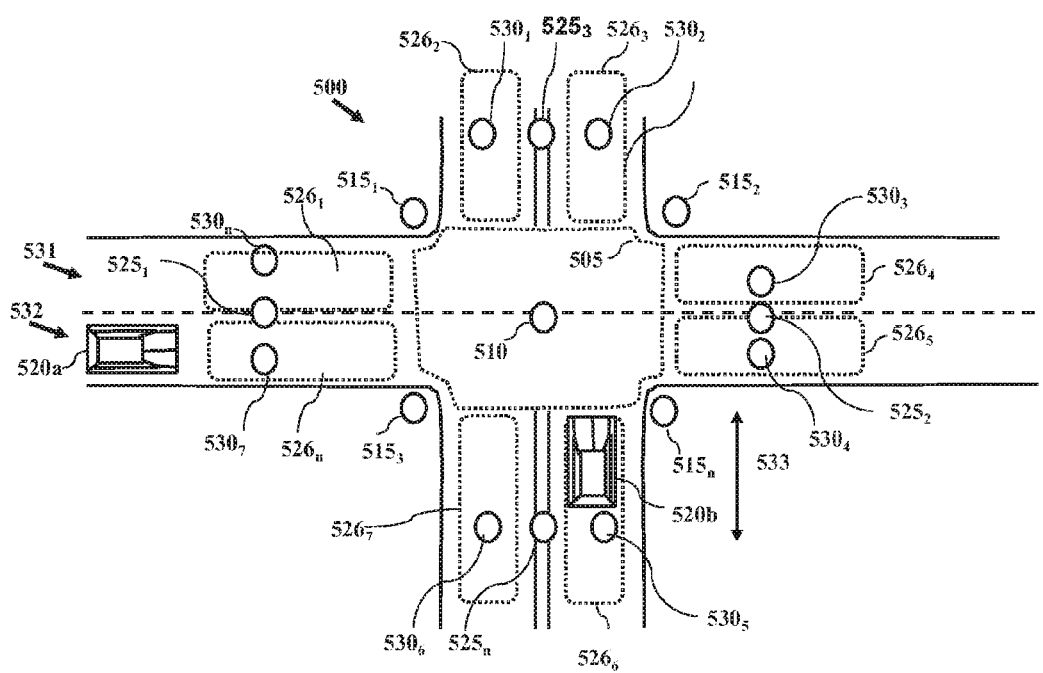
FIG. 5 depicts a graphical representation of detection areas according to one or more embodiments.

FIG. 5 depicts a graphical representation of detection areas according to one or more embodiments. According to one embodiment, a scanning system may detect objects relative to one or more particular areas of an intersection. In one embodiment, scanning devices may be positioned to detect objects within a single defined geographic area of the intersection, such as the intersection of two roads. Alternatively, or in combination, multiple detection areas may be assigned to an intersection by a scanning system. In addition, the scanning system may employ one or more scanning devices for each detection area. References to scanning locations may relate to fixed positions for locating a scanning device.

In FIG. 5, intersection 500 relates to an exemplary representation of an intersection where a plurality of locations for positioning scanning devices and scanning device detection areas are depicted. Detection area 505 relates to a general area associated with an intersection. Scanning device location 510 relates to a central location of intersection 500. In certain embodiments, detection area 505 may be a single area employed for object detection, wherein the scanning system includes a single scanning device positioned, or multiple scanning devices located positioned at scanning device location 510. Scanning device locations $515_{1-n}$ are positioned relative to corners of intersection 500. It should be appreciated that a single scanning device, or alternatively multiple scanning devices, may be positioned in the locations identified in FIG. 5. It should also be appreciated that scanning device locations may be located in other areas of intersection 500. For purposes of illustration, FIG. 5 depicts vehicles 520a-520b.

Scanning device locations $525_{1-n}$ may be configured for scanning detection area 505 associated with an intersection and/or detection areas of lanes or portions of a roadway prior to entering detection area 505, such as detection areas $526_{1-n}$. Scanning device locations $530_{1-n}$ relate to locations for positioning scanning devices in order to detect objects in detection areas $526_{1-n}$. In certain embodiments, detection areas $526_{1-n}$ may each be assigned a single scanning device, wherein devices are positioned in scanning device locations $530_{1-n}$. In another embodiment, detection areas $526_{1-n}$ may each be assigned a scanning device for one or more areas. By way of example, placing scanning devices in scanning device locations $525_{1-n}$, wherein each scanning device in scanning device locations $525_{1-n}$ are associated with two detection areas (e.g., device location $525_3$ assigned to detection areas $526_2$ and $526_3$). In certain embodiments, detection areas $526_{1-n}$ may each be assigned or associated with a particular lane, such as lane 531 and lane 532. According to another embodiment, the location of scanning device locations $525_{1-n}$ and scanning device locations $530_{1-n}$ may be positioned a distance, such as distance 533, back from detection area 505. Locations $525_{1-n}$ and $530_{1-n}$ may be determined to allow for tracking of objects entering and exiting an intersection. By tracking objects entering and leaving intersection 500, the scanning system may identify the number of objects in an intersection and the travel characteristics of objects relative to the intersection. Assessing travel characteristics of each vehicle may allow for determining the probability of a collision, running a red light, etc. Another embodiment of the disclosure is directed to the identification of moving elements in the sensor field of view, for the purpose of providing tracking and motion elimination in computer vision algorithms (where the detection frame overlaps some or all of the radar sensor field of view).

FIGS. 6A-6D depict graphical representations of object detection according to one or more embodiments. According to one embodiment, scanning devices employ integrated radar detection of objects. In certain embodiments, objects, such as vehicles, may be assigned a coarse or generalized area of free space that may be employed for determining position, speed and proximity to other objects by the scanning system. Unlike positioning data alone, coarse or generalized representations of objects allows for assessing the likelihood of two objects colliding.

Figure 6A:
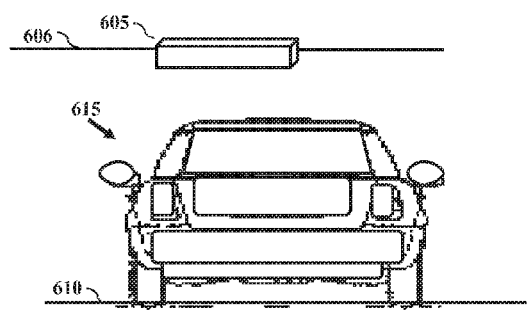
FIGS. 6A-6D depict graphical representations of object detection according to one or more embodiments.
Figure 6B:
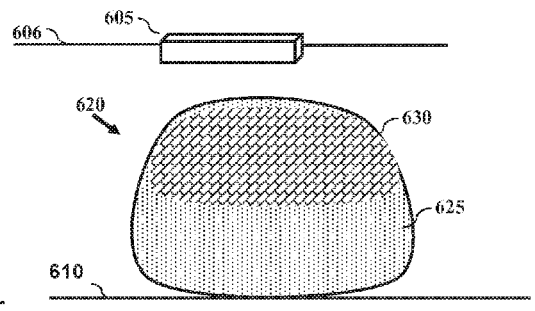

Referring to FIG. 6A, scanning device 605 (e.g., scanning device 400) is depicted mounted to a cable/structure at a height 606 above roadway 610. Detected object 615 is shown as a vehicle. FIG. 6B depicts object 615 generalized as object 620. Object 620 may relate to a coarse rectangular cross section. According to one embodiment, surfaces of the vehicle may also be determined, shown as surface 625 and surface 630, wherein the difference in surface representation may relate to differences in surface geometry/distance to a detected vehicle.

Figure 6C:
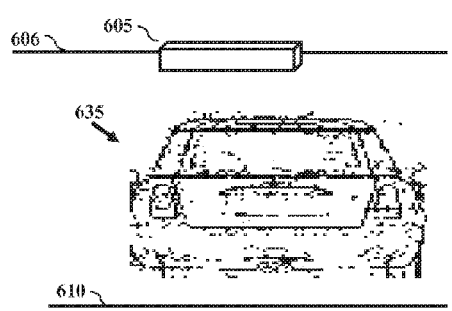
Figure 6D:
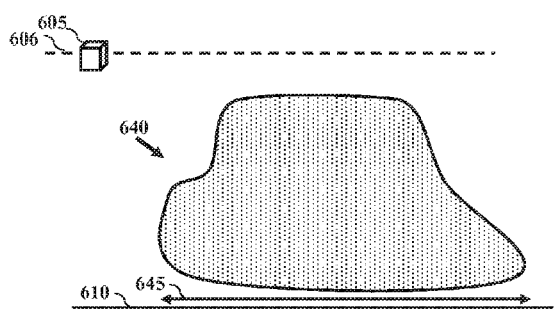

FIG. 6C depicts detection of object 615 generalized as point cloud 635. Similar to object 620, point cloud 635 may relate to a coarse rectangular cross section. FIG. 6D depicts a side profile 640 of a detected object. Side profile 640 may be generated by a scanning device to determine the approximate length of a vehicle, shown as 645.

According to certain embodiments, point cloud 635 may be a point cloud of data points detected by scanning device 605. Point cloud 635 and side profile 640 may each relate to exterior surface areas of an object. Point cloud 635 and side profile 640 may be determined from a side, from an elevated position, or detected at an angle. In certain embodiments, point cloud 635 and/or side profile 640 may be based on data points determined by an integrated radar sensor having a frequency within the range of 76-82 GHz and/or based on one or more of vertical and horizontal scanning.

Figure 7:
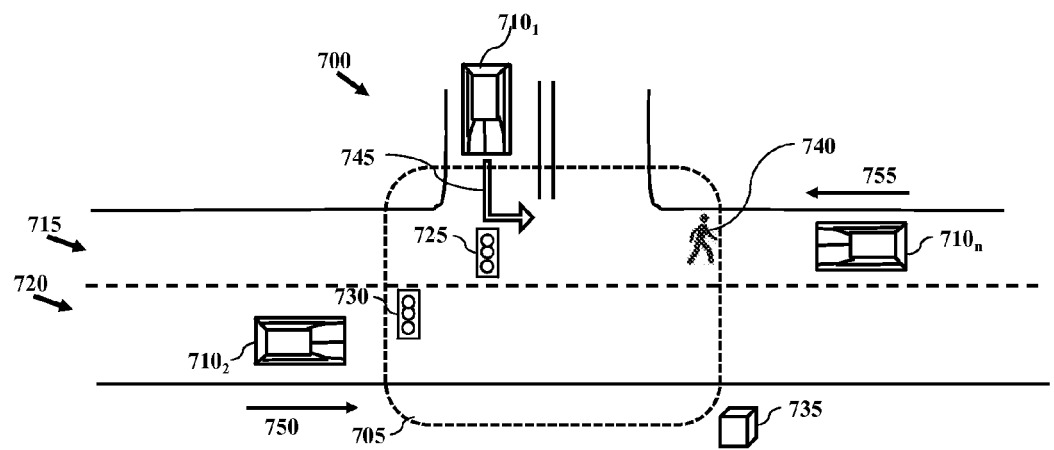
FIG. 7 depicts a graphical representation of a roadway according to one or more embodiments.

FIG. 7 depicts a graphical representation of a roadway according to one or more embodiments. According to one embodiment, one or more warnings, such as of a collision warning, red light warning, red light violation warning and operation characteristics of objects may be determined and transmitted to objects. Intersection 700 is depicted with detection area 705 and vehicles $710_{1-n}$. In one embodiment, a scanning system may provide to each object, in this case vehicles $710_{1-n}$, the position of each vehicle including lane identification, and any potential warnings. In one embodiment, a scanning system identifies vehicles $710_{1-n}$ and tracks the position, speed, course or travel and lane information, such as lanes 715 and 720, for each object. In addition to determining the operation characteristics and position of each vehicle, the scanning system may determine and/or monitor the state of traffic control units (e.g., traffic lights, etc.) such as traffic control unit 725 and traffic control unit 730. By way of example, vehicle $710_1$ may be approaching intersection to turn as shown by direction 745 with a green traffic light signal from traffic control unit 725 while vehicles $710_2$ and $710_n$ approach traveling directions 750 and 755 respectively. Based on one or more factors, the scanning system may output data that may be used by vehicle $710_1$ to alert a driver of the vehicle of the presence of another vehicle, etc. In a similar embodiment, detection of pedestrian 740 by the scanning system may generate a warning for one or more of vehicles $710_{1-n}$.

In certain embodiments, a control device 735 may interoperate with one or more scanning devices. Control device 735 may receive tracking information from scanning devices and transmit the tracking data to vehicles. In other embodiments, control device 735 may be configured to switch or change traffic control signals 725 and 730 based on object detection. By way of example, control device may change a green signal indicated for vehicle $710_n$ if pedestrian 740 is detected crossing intersection 700.

Figure 8:
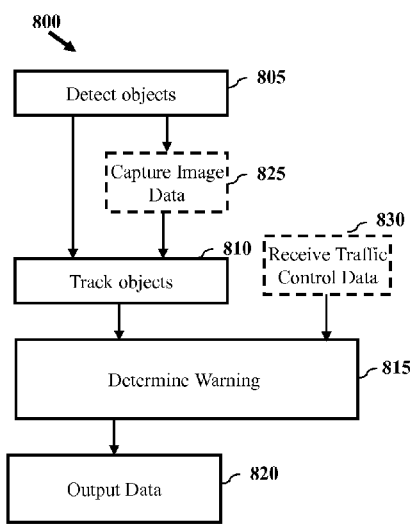
FIG. 8 depicts a process for detecting objects according to one or more embodiments.

FIG. 8 depicts a process for detecting objects according to one or more embodiments. Process 800 includes elements similar to those discussed above with respect to FIG. 3, which is incorporated by reference for the discuss of process 800. Similar to process 300, process 800 may be initiated at block 805 by detecting one or more objects by a device (e.g., scanning device 205). Process 800 also includes tracking one or more detected objects by a scanning device to determine tracking data at block 810. The scanning device can output data at block 820.

According to one embodiment, process 800 may include determining whether a warning is required for tracked objects, such as one or more of a collision warning system, red light warnings, red light violation warnings, etc., at block 815. According to one embodiment, the scanning system may determine that a warning is required based on one or more detected characteristics of objects in an intersection and other data. FIG. 9 below discusses a process for determining a warning condition according to one or more embodiments. Warnings may include directional information, and identification information. Identification information allows a vehicle for which the warning is issued to be identified in order to identify the warning condition and/or one or more data flags to be processed by an object.

In one embodiment, outputting data at block 805 includes transmitting tracking data to one or more vehicles associated with detected objects. In another embodiment, outputting data at block 820 includes transmitting a collision warning signal to one or more detected objects based on the tracking.

In addition to integrated radar detection of an object, process 800 may optionally include capture of image data for objects at block 825. In one embodiment, image capture may relate to one or more of video and digital imagining of objects and an intersection. Image data detected at block 825 may include graphical image data (e.g., pixel data) for the one or more objects. Data points of the image data may be correlated to representations of an object.

According to another embodiment, process 800 may optionally include receiving traffic control data, such as the current state of a traffic signal, timing information of traffic signals, etc.

Figure 9:
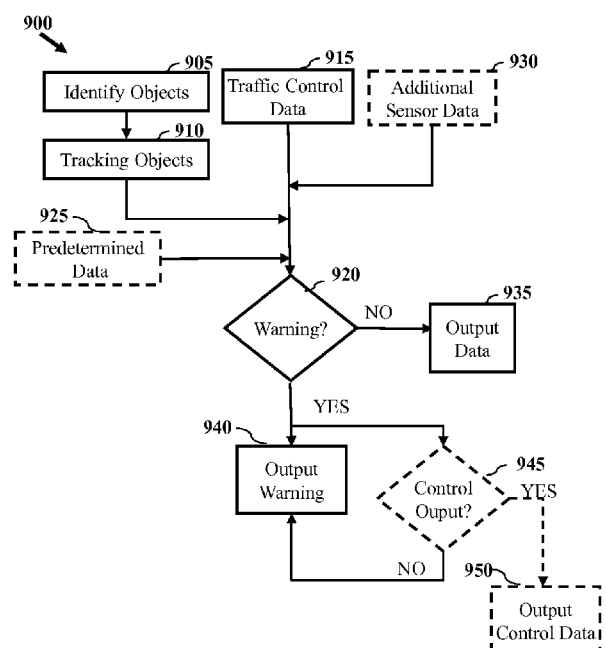
FIG. 9 depicts a process for determining a warning condition according to one or more embodiments.

FIG. 9 depicts a process for determining a warning condition according to one or more embodiments. Process 900 may perform a weighted analysis of one or more factors to determine whether a warning notification is required for objects in an intersection. Process 900 may include identifying objects at block 905 and tracking objects at block 910. In one embodiment, an intersection is continuously scanned and detected objects are continuously updated to determine which objects are positioned in and around an intersection. According to another embodiment, traffic control data at block 915 may be employed in addition to identified objects to determine whether a warning should be output at decision block 920. In that fashion, traffic control information may be determined at block 915 for at least a portion of the roadway and outputting data based on the traffic control information.

Decision block 920 may optionally received predetermined data 925 relating to data accounted and calculated for previous objects within an intersection. For example, predetermined data may 925 may include the average travel time through an intersection, number of vehicles that can enter and exit an intersection during a traffic light cycle, etc.

In another embodiment, additional sensor data 930 from one or more additional scanning devices may be employed at decision block 920 to determine whether a warning should be output. Tracking may be based on receiving data, such as additional sensor data 930, from a scanning device detecting objects at a location of the roadway different from the location of the intersection.

According to one embodiment, decision block 920 may employ a weighted analysis of received values to estimate travel paths of objects within and near an intersection to assess the likelihood of a collision, red light violation, red light warning, etc. The calculation at block 920 may be a dynamic calculation that is continuously calculated, or calculated with a fast period, in order to determine whether a warning situation exists. In certain embodiments, a warning may be issued in connection with or separate from tracking data. In other embodiments, tracking data may be output without warning data. When warning data is not to be output (e.g., "NO" path out of decision block 920), process 900 outputs tracking data at block 935. When warning data is to be output (e.g., "YES" path out of decision block 920), process 900 outputs a warning at block 940.

In certain embodiments, process 900 may optionally include determining whether to output control data for one or more traffic controllers (e.g., traffic signals, etc.) at optional decision block 945. When control data is not to be output (e.g., "NO" path out of decision block 945), process 900 outputs tracking data at block 935. When warning control data is to be output (e.g., "YES" path out of decision block 945), process 900 outputs to a traffic controller at block 950. For example, control data may be a signal to change the traffic lights to shift traffic flow, stop traffic, change traffic timing, etc.

While this disclosure has been particularly shown and described with references to exemplary embodiments thereof, it will be understood by those skilled in the art that various changes in form and details may be made therein without departing from the scope of the embodiments encompassed by the appended claims.

What is claimed is:

1. A method for providing intersection positioning data, the method comprising:
   detecting a plurality of objects by a device, wherein the plurality of objects comprises a plurality of vehicles and are detected relative to an intersection by an integrated radar sensor of the device;
   tracking the plurality of detected objects by the device to determine tracking data, wherein tracking includes determining a number of detected objects and determining speeds and positions of the plurality of detected objects;
   transmitting the tracking data to at least one of the plurality of detected objects by the device, the tracking data including the number of detected objects and the speeds and positions of the plurality of detected objects; and
   transmitting a collision warning signal to at least one of the plurality of detected objects based on the number of detected objects, the speeds and positions of the plurality of detected objects, a predetermined average travel time through the intersection, and a predetermined number of vehicles that can enter and exit the intersection during a traffic light cycle.

2. The method of claim 1, wherein detecting the plurality of objects includes detecting vehicles by at least one of a solid-state radar sensor and chip based radar sensor, wherein the integrated radar sensor of the device is configured to track the plurality of objects simultaneously.

3. The method of claim 1, wherein detected objects relate to one or more of a vehicle, pedestrian, and movable objects in general.

4. The method of claim 1, wherein tracking includes continuous monitoring of object speed, heading, and position relative to objects detected in the intersection.

5. The method of claim 1, wherein tracking includes estimating vehicle dimensions and vehicle path.

6. The method of claim 1, wherein the plurality of detected objects includes a vehicle and a pedestrian, and the method further comprising transmitting an alert signal to the vehicle about presence of the pedestrian.

7. The method of claim 1, wherein tracking includes receiving data by the device from a scanning device detecting objects at a location different from the intersection.

8. The method of claim 1, further comprising determining traffic control information for the intersection, and outputting data based on the traffic control information.

9. A system for providing intersection positioning data, the system comprising:
   an integrated radar sensor configured to detect a plurality of objects relative to an intersection, wherein the plurality of objects comprises a plurality of vehicles;
   a memory for storing a predetermined average travel time through the intersection and a predetermined number of vehicles that can enter and exit the intersection during a traffic light cycle; and
   a processor configured to:
   track the plurality of detected objects to determine tracking data, wherein tracking includes determining a number of detected objects and determining speeds and positions of the plurality of detected objects;
   transmit the tracking data to at least one of the plurality of detected objects, the tracking data including the number of detected objects and the speeds and positions of the plurality of detected objects; and
   transmit a collision warning signal to at least one of the plurality of detected objects based on the number of detected objects, the speeds and positions of the plurality of detected objects, the predetermined average travel time through the intersection, and the predetermined number of vehicles that can enter and exit the intersection during a traffic light cycle.

10. The system of claim 9, wherein the integrated radar sensor is at least one of a solid-state radar sensor and chip based radar, and the integrated radar sensor is configured to detect the plurality of objects and to track the plurality of objects simultaneously.

11. The system of claim 9, wherein detected objects relate to one or more of a vehicle, pedestrian and movable objects in general.

12. The system of claim 9, wherein tracking includes continuous monitoring of object speed, heading, and position relative to objects detected in the intersection.

13. The system of claim 9, wherein tracking includes estimating vehicle dimensions and vehicle path.

14. The system of claim 9, wherein the plurality of detected objects includes a vehicle and a pedestrian, and the processor is further configured to transmit an alert signal to the vehicle about presence of the pedestrian.

15. The system of claim 9, wherein tracking includes receiving data from a scanning device detecting objects at a location different from the intersection.

16. The system of claim 9, wherein the processor is further configured to determine traffic control information for the intersection, and to output data based on the traffic control information.

17. A device for providing intersection positioning data, the device comprising:
- a positioning module configured to determine position of the device;
- an integrated radar sensor configured to detect a plurality of vehicles relative to an intersection;
- a memory for storing a predetermined average travel time through the intersection and a predetermined number of vehicles that can enter and exit the intersection during a traffic light cycle; and
- a processor configured to
  - track the plurality of detected vehicles to determine tracking data, wherein tracking includes determining a number of detected vehicles and determining speeds and positions of the plurality of detected vehicles; and
  - transmit a collision warning signal to at least one of the plurality of vehicles based on the number of detected vehicles, the speeds and positions of the plurality of detected vehicles, the predetermined average travel time through the intersection, and the predetermined number of vehicles that can enter and exit the intersection during a traffic light cycle.

* * * * *